Figure 1:
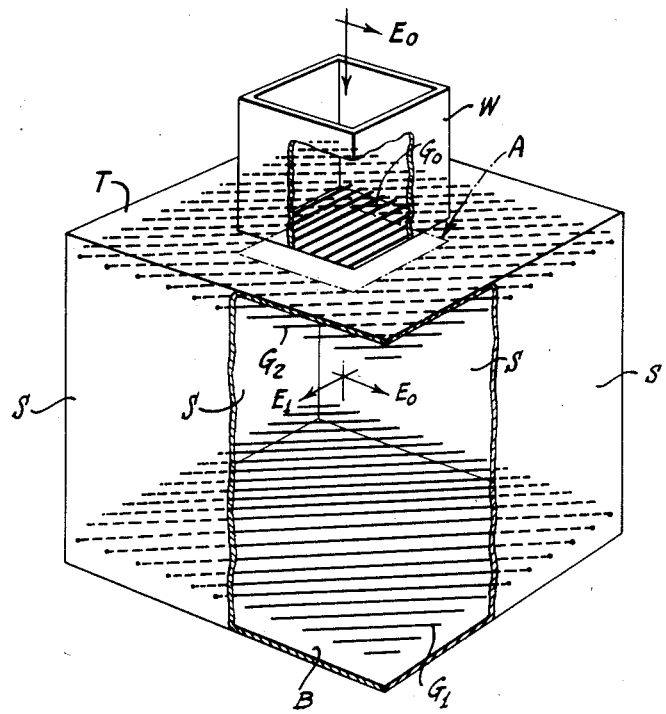

June 28, 1960  G. GUANELLA  2,943,175

HIGH FREQUENCY HEATING APPARATUS

Filed April 3, 1958

INVENTOR
GUSTAV GUANELLA
BY
ATTORNEY

United States Patent Office 2,943,175
Patented June 28, 1960

2,943,175
HIGH FREQUENCY HEATING APPARATUS
Gustav Guanella, Zurich, Switzerland, assignor of sixty percent to Karl Rath, New York, N.Y.
Filed Apr. 3, 1958, Ser. No. 726,103
5 Claims. (Cl. 219—10.55)

The present invention relates to high frequency heating apparatus, more particularly though not limitatively, to microwave ovens, wherein foods or other substances to be heated or otherwise treated by high frequency wave energy are placed in a closed metallic chamber forming an oven cavity into which is fed high frequency or microwave energy or waves through a suitable coupling, such as a wave guide connecting the chamber or cavity with a microwave generator, such as a magnetron, klystron or equivalent high frequency oscillator.

Known heating or cooking devices of this type have the disadvantage that standing waves may be set up within the oven cavity by reflection of the incoming radio waves by the cavity walls. As a result, the energy absorption or heating effect of the food or other material to be heated may be dependent largely upon its position within the cavity, in such a manner as to result in a non-uniform energy absorption or uneven distribution of the heating effect throughout the cavity space. Besides, difficulties may arise, especially in the case of relatively low heating loads, if an attempt is made to properly match the cavity impedance with the impedance of the generator in an effort to achieve optimum operating conditions and efficiency.

It has already been proposed, in order to reduce the above difficulties and defects, to provide a continuously revolving body in the form of a stirring fan, to diffuse the incoming waves by breaking up their energy pattern, to more evenly distribute the wave energy throughout the space of the oven cavity.

As will be understood, the use of movable devices in the oven cavity, such as a fan or the like, is objectionable for many reasons of both technical and practical nature.

Accordingly, an important object of the present invention is the provision of simple and efficient means to substantially prevent the formation of standing waves in the oven cavity of a high frequency heating or cooking device of the type referred to, substantially without the use of movable parts or devices.

A more specific object of the invention is the provision of improved means in connection with a microwave or the like high frequency heating apparatus, to ensure a substantially uniform energy absorption and heating effect throughout the oven space or cavity.

Another object of the invention is the provision of means in a microwave or high frequency heating apparatus of the above type, to substantially prevent reaction between the oven cavity and the generator feeding radio waves or energy to said cavity.

Yet another object of the invention is the provision of improved means in a high frequency heating apparatus of the type referred to, to insure and maintain a favorable impedance match between the oven cavity and the generator supplying the operating high frequency waves or energy.

Figure 2:
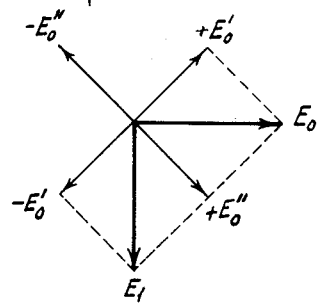

The invention, both as to its ancillary objects as well as novel aspects, will be better understood from the following detailed description of a preferred embodiment thereof, taken in reference to the accompanying drawing forming part of this specification and wherein:

Fig. 1 is a schematic perspective view of a high frequency heating device embodying the improved features according to the invention; and Fig. 2 is a vector diagram explanatory of the function and operation of the invention.

With the foregoing objects in view, the invention involves generally the utilization of means in the oven cavity of a high frequency or microwave heating device of the general type described hereinabove, whereby to change the direction or plane of polarization of the high frequency or microray waves upon reflection by the cavity walls, preferably though not limitatively, by an angle of 90°, to substantially prevent the setting up of standing waves and to obtain a uniform distribution of high frequency energy throughout the space enclosed by the oven cavity. While satisfactory results may be obtained by a 90° rotation of the plane of polarization, the change of the polarization angle may be different from this value or the reflected waves converted from plane to circular or elliptical polarization, to suit special operating conditions and requirements. In order to change the polarization angle, stationary polarization grid structures of metal or a suitable dielectric, or any other known polarization control means, may be employed for the purposes of the invention, as will become further apparent as the following detailed description proceeds.

According to a preferred embodiment of the invention, wave energy introduced through an inlet in a wall of the treating chamber or oven cavity and having a predetermined direction of polarization, has its polarization rotated by 90° upon being reflected back and forth by said wall and the opposite wall of said chamber. This may be effected in a simple manner by the provision of a pair of polarizing grids arranged adjacent to said walls and having spaced conductors of either the same orientation or being oriented by a 90° angle relative to one another, said conductors further forming 45° angles with the polarization of the wave components traveling back and forth between said walls. One of said grids has an opening coinciding with said inlet, to afford free entrance of wave energy into said chamber from a suitable high frequency source. In order to prevent reflected energy from being returned to and reacting upon said source, further means are provided to allow of free passage of wave energy from said source to said chamber and to block return flow of reflected energy having a different direction of polarization. This may consist simply of a further polarizatiton grid overlying the inlet opening of said chamber and being oriented at an angle to freely pass input waves from said source and to substantially prevent energy return flow of reflected wave energy. There is provided in this manner a most simple and efficient high frequency heating chamber enabling input waves to be fed from a source without causing standing waves due to repeated reflection of said waves by the walls of the chamber, on the one hand, while substantially preventing return flow of reflected energy from said chamber to said source, on the other hand. This, in turn, results in an equalization of thermal gradient variations, whereby to ensure uniform heating of the material placed in said chamber with a minimum of losses or with maximum overall efficiency under varying load conditions.

Referring more particularly to the drawing, Fig. 1, the embodiment shown comprises a rectangular metallic chamber having a top wall T, a bottom wall B and side walls S, forming an oven cavity into which are fed high frequency waves or oscillations from a suitable source through a wave guide W, terminating in an opening in the wall T, in the example illustrated. The direction of polarization of the incoming waves E is assumed to be parallel to one pair of opposite edges of the top wall T, as indicated. Mounted in front of the bottom wall B and opposite to the top wall T is a polarization grid $G_1$, designed and functioning in the manner as described in the following. According to a simple construction, such a grid may consist of a plurality of parallel rod-shaped conductors spaced from one another by a predetermined distance to reflect incoming radio waves having a direction of polarization parallel to said conductors and to freely pass waves having a direction of polarization at right angle to said conductors.

According to the present invention, the direction of the conductors of the grid $G_1$ is displaced by an angle of 45° relative to the direction of polarization $E_0$ of the incoming waves, while the distance of the grid from the bottom wall B may be one quarter of the operating wave length or an odd multiple thereof, according to a preferred embodiment of the invention. As a result, the grid $G_1$ reflects the component $E_0'$ of the incoming oscillation $E_0$ coinciding with the direction of the conductors, as shown at $-E_0'$ in Fig. 2, while the component $E_0''$ at right angle to the direction of the conductors will be passed freely by the grid. The latter component is impinged upon the bottom wall B from which it is in turn reflected to repass through the grid $G_1$, as indicated at $-E_0''$ in the drawing. Since, according to the example mentioned, this component has traveled through a path greater by one half of the operating wave length, or an odd multiple thereof, compared with the component $E_0'$, it will appear above the grid $G_1$ as a component $+E_0''$ being displaced by 180° relative to component $-E_0''$ and combining with the component $-E_0'$ to a resultant reflected oscillation $E_1$ whose direction of polarization has been rotated by an angle of 90° relative to the incoming waves or oscillation $E_0$.

It is relatively easy to prevent the oscillation $E_1$ from reacting or being reflected upon the high frequency generator connected to the opposite end of the wave guide W. To this end, a further polarization grid $G_0$ may be placed over the entrance opening of the cavity or wave guide W. The grid $G_0$ is so oriented as to readily pass the incoming waves or oscillation $E_0$ and to block the reflected oscillation $E_1$ having a polarization rotated by 90° by the grid $G_1$. In other words, the direction of the conductors of the grid $G_0$ is at a right angle to the direction of polarization of the incoming oscillation $E_0$, as shown in the drawing. If the high frequency energy is fed into the cavity through a dipole, coupling loop or the like polarized coupling element, grid $G_0$ may be dispensed with, since these devices are inherently insensitive to oscillations having a polarization at right angle to the orientation thereof.

A substantial improvement may be achieved in an arrangement aforedescribed by the provision of a further polarization grid $G_2$ adjacent to the wall T to which is connected the wave guide W. The direction of the conductors of this grid is at a 45° angle to the direction of polarization of the incoming oscillation $E_0$, that is, the conductors of the grid $G_2$ are either parallel or at a right angle to the conductors of the grid $G_1$. The grid $G_2$ is further provided with an opening or free space to allow free passage of the incoming oscillation $E_0$, as indicated at A in the drawing. Otherwise, this grid may be constructed in the same manner as the grid $G_1$, that is, having a distance from the wall T equal to a quarter of the operating wave length or an odd multiple thereof.

As can be readily seen, the oscillation $E_1$ impinged upon the grid $G_2$ will be subjected to a renewed rotation of its polarization by an angle of 90°, whereby the radiant energy within the cavity will be composed of two waves or components traveling in opposite directions and being relatively polarized by an angle of 90° with respect to one another. More specifically, the wave traveling from the top to the bottom, or in the downward direction in Fig. 1, has a polarization $E_0$ being parallel to the one pair of opposite edges of the top wall T, while the wave traveling in the upward direction has a polarization $E_1$ displaced by a right angle to said first polarization or parallel to the remaining pair of opposed edges of the top wall T. Formation of a standing wave by the two component waves is thus prevented in a simple and reliable manner, without the use of any moving parts or devices. This, in turn, results in the absence of regions of relatively high and low energy density with the oven cavity, thus insuring a substantially uniform heating effect independent of the position of the material or goods to be treated. Moreover, reaction upon the high frequency generator and difficulties in obtaining and maintaining impedance matching between the cavity and generator are largely overcome by the invention. Furthermore, with certain types of goods or materials having special properties or characteristics, the use of waves of different polarization, as provided by the present invention, may result in additional desirable effects and advantages of both practical and technical nature.

In certain cases it may be advantageous to provide an arrangement for adjusting the distance of at least one of the polarization grids from the adjacent wall of the oven cavity. This may enable it to obtain optimum operating conditions, such as a minimum of reaction upon the high frequency generator, or to achieve any other effects and results.

In place of the polarization grids consisting of a plurality of parallel conductors to effect the change of polarization according to the invention, other known polarization control means may be employed, such as parallel strips of a material of high dielectric constant. In each case, one or both of the grids may serve as a support for the material to be heated.

According to a further modification of the invention, high frequency energy may be fed to the oven cavity at a plurality of points by either a single or separate high frequency generators. Thus, for instance, in an arrangement according to Fig. 1, there may be provided a second wave guide terminating in the bottom wall B and feeding a second wave or oscillation having a direction of polarization forming a right angle to the plane of the drawing, that is, being perpendicular to the oscillation $E_0$ or parallel to the oscillation $E_1$. Again in this case, the energy within the oven cavity is composed of two components travelling in opposite directions and having directions of polarization forming a right angle with one another. When employing separate high frequency generators, each of the two waves fed will, in turn, consist of two components whose frequencies in general will differ from one another to a certain extent.

In the foregoing, the invention has been described in reference to a specific illustrative device. It will be evident, however, that variations and modifications, as well as the substitution of equivalent elements for those shown herein for illustration, may be made without departing from the broader scope and spirit of the invention as set forth in the appended claims. The specification and drawing are accordingly to be regarded in an illustrative rather than in a limiting sense.

I claim:
1. High frequency heating apparatus comprising a chamber forming an oven cavity and having a first wall and a second wall opposite to said first wall, first and second polarization control means within said chamber adjacent to said first and second walls, respectively, wave inlet means through one of said walls and the adjacent polarization control means, to feed high frequency waves having a predetermined direction of polarization to said chamber, said first and second polarization control means being oriented relative to said predetermined direction, to cause the reflected wave components traveling in opposite directions between said walls to be polarized in directions including a predetermined angle with one an- other, and means to substantially prevent a return flow of reflected wave energy through said inlet means.

2. High frequency heating apparatus comprising a chamber forming an oven cavity and having a first wall and a second wall opposite to said first wall, first and second polarization control means within said chamber adjacent to said first and second wall, respectively, wave inlet means through one of said walls and the adjacent polarization control means, to feed high frequency waves having a predetermined direction of polarization to said chamber, said first and second polarization control means being oriented relative to said predetermined direction, to cause the reflected wave components traveling in opposite directions between said walls to be polarized in directions forming substantially a right angle with one another, and means to substantially prevent a return flow of reflected wave energy through said inlet means.

3. High frequency heating apparatus comprising a closed metallic chamber forming an oven cavity and having a first wall and a second wall opposite and parallel to said first wall, a first and second polarization grid each comprising spaced parallel conductors and mounted within said chamber in parallel and spaced relation to said first and second walls, respectively, wave inlet means through one of said walls and the adjacent polarization grid, to feed high frequency waves having a predetermined direction of polarization to said chamber, said grids being oriented relative to said predetermined direction, to cause the reflected wave components traveling in opposite directions between said walls to be polarized in directions including a predetermined angle with one another, and means to substantially prevent a return flow of reflected wave energy through said inlet means.

4. High frequency heating apparatus comprising a closed metallic chamber forming an oven cavity and having a first wall and a second wall opposite and parallel to said first wall, a first and a second polarization grid each comprising spaced parallel conductors and mounted within said chamber in spaced and parallel relation to said walls, respectively, and at a distance from said walls equal to a quarter wave length or an odd multiple thereof of the operating frequency, wave inlet means through said first wall and said first polarization grid, to feed high frequency waves having a predetermined direction of polarization to said chamber, said grid conductors being oriented to form angles of 45° with said predetermined direction to cause the reflected wave components traveling in opposite directions between said walls to be polarized in directions forming a substantially right angle with one another, and means to substantially prevent a return flow of reflected wave energy through said inlet means.

5. In high frequency heating apparatus as claimed in claim 4, said inlet means being comprised of a wave guide terminating in aligned openings in said first wall and said first polarization grid, and said last means being comprised of a further polarization grid overlying said openings and having conductors oriented at right angle to said predetermined direction.

References Cited in the file of this patent

UNITED STATES PATENTS

| | | |
|---|---|---|
| 2,480,682 | Stiefel | Aug. 30, 1949 |
| 2,790,054 | Haagensen | Apr. 23, 1957 |

FOREIGN PATENTS

| | | |
|---|---|---|
| 664,926 | Great Britain | Jan. 16, 1952 |